(12) United States Patent
Partyka

(10) Patent No.: US 6,894,975 B1
(45) Date of Patent: May 17, 2005

(54) SYNCHRONIZATION AND ACCESS OF THE NODES IN A COMMUNICATIONS NETWORK

(76) Inventor: Andrzej Partyka, 370 Finch La., Bedminster, NJ (US) 07921

( * ) Notice: Subject to any disclaimer, the term of this patent is extended or adjusted under 35 U.S.C. 154(b) by 0 days.

(21) Appl. No.: 09/483,816

(22) Filed: Jan. 15, 2000

(51) Int. Cl.[7] ............ G06L 11/00; H04J 3/06; H04L 27/30
(52) U.S. Cl. .............. 370/235; 370/503; 375/357
(58) Field of Search .............. 370/235, 342, 370/503, 350, 330, 335, 515; 375/132, 134, 357, 373; 340/870.11; 380/34

(56) References Cited

U.S. PATENT DOCUMENTS

| | | |
|---|---|---|
| 3,609,729 A | 9/1971 | Anderson |
| 4,040,054 A | 8/1977 | Overman |
| 4,435,821 A | 3/1984 | Ito et al. |
| 4,606,041 A | 8/1986 | Kadin |
| 4,612,652 A | 9/1986 | Kadin |
| 4,614,945 A | 9/1986 | Brunius et al. |
| 4,653,068 A | 3/1987 | Kadin |
| RE32,905 E | 4/1989 | Baran |
| 4,843,638 A | 6/1989 | Walters |
| 5,079,768 A | 1/1992 | Flammer |
| 5,121,407 A | 6/1992 | Partyka et al. |
| 5,121,408 A * | 6/1992 | Cai et al. ............ 375/134 |
| 5,204,855 A | 4/1993 | Bebee et al. |
| 5,287,384 A | 2/1994 | Avery et al. |
| 5,309,448 A | 5/1994 | Bouloutas et al. |
| 5,390,166 A | 2/1995 | Rohani et al. |
| 5,400,246 A | 3/1995 | Wilson et al. |
| 5,408,506 A | 4/1995 | Mincher et al. |
| 5,414,731 A * | 5/1995 | Antunes et al. ............ 375/134 |
| 5,428,602 A | 6/1995 | Kemppainen |
| 5,428,637 A | 6/1995 | Oliva et al. |
| 5,436,935 A * | 7/1995 | Bernhard et al. ............ 375/367 |
| 5,438,329 A | 8/1995 | Gastouniotis et al. |
| 5,442,659 A * | 8/1995 | Bauchot et al. ............ 375/134 |
| 5,517,187 A | 5/1996 | Bruwer et al. |

(Continued)

OTHER PUBLICATIONS

Robert C. Dixon, "Spread Spectrum Systems", Johm Wiley & Sons, 1984 ISBN 0–471–88309–3, pp: 52–54, 217–235.

(Continued)

*Primary Examiner*—Afsar Qureshi

(57) ABSTRACT

A wireless network is provided with a method to eliminate the commonly encountered problems associated with the development of the master timing in a network. According to the provided method, the master network timing is completely eliminated. Accordingly, in an exemplary implementation of the present invention, each node of a network has its own master clock used for transmissions that is free running and not adjusted in any way. Each node has also a receiver equipped with a mechanism to acquire and track the timing of all the network nodes that are within the communications range and that are permitted the access. In essence there is no master network timing and each transmitter hops and transmits according to its master clock. Furthermore, it is the responsibility of each receiver to track multiple timing separately for each hopping transmitter. The provided method is suitable for a wide range of applications including wireless networks and in particular for networks using frequency hopping.

24 Claims, 10 Drawing Sheets

U.S. PATENT DOCUMENTS

| | | | |
|---|---|---|---|
| 5,532,702 | A | 7/1996 | Mintz |
| 5,546,422 | A | 8/1996 | Yokev et al. |
| 5,548,582 | A | 8/1996 | Brajal et al. |
| 5,553,094 | A | 9/1996 | Johnson et al. |
| 5,586,141 | A | 12/1996 | Ashdown et al. |
| 5,595,342 | A | 1/1997 | McNair et al. |
| 5,610,907 | A | 3/1997 | Barret |
| 5,657,343 | A | 8/1997 | Schilling |
| 5,659,303 | A | 8/1997 | Adair, Jr. |
| 5,668,828 | A | 9/1997 | Sanderford, Jr. et al. |
| 5,748,100 | A | 5/1998 | Gutman et al. |
| 5,748,103 | A | 5/1998 | Flach et al. |
| 5,854,994 | A | 12/1998 | Canada et al. |
| 5,937,002 | A | 8/1999 | Andersson et al. |
| 5,956,621 | A | 9/1999 | Weiss et al. |
| 5,960,047 | A | 9/1999 | Proctor et al. |
| 6,018,528 | A | 1/2000 | Gitlin et al. |
| 6,058,137 | A | 5/2000 | Partyka |
| 6,144,693 | A | 11/2000 | Tabeta |
| 6,188,715 | B1 | 2/2001 | Partyka |
| 6,195,018 | B1 | 2/2001 | Ragle et al. |
| 6,222,440 | B1 | 4/2001 | Heller |
| 6,223,048 | B1 | 4/2001 | Noll Barreto et al. |
| 6,333,975 | B1 | 12/2001 | Brunn et al. |
| 6,377,609 | B1 | 4/2002 | Brennan, Jr. |
| 6,389,057 | B1 | 5/2002 | Haarsten |
| 6,463,040 | B1 | 10/2002 | Dutta |
| 6,466,138 | B1 | 10/2002 | Partyka |
| 6,466,608 | B1 * | 10/2002 | Hong et al. ............ 375/137 |
| 6,535,544 | B1 | 3/2003 | Partyka |
| 6,567,459 | B1 | 5/2003 | Hakkinen et al. |
| 6,700,920 | B1 | 3/2004 | Partyka |
| 6,728,293 | B1 | 4/2004 | Partyka |
| 6,731,223 | B1 | 5/2004 | Partyka |
| 6,760,319 | B1 | 7/2004 | Gerten et al. |
| 6,778,521 | B1 | 8/2004 | Korpela et al. |
| 2002/0027504 | A1 | 3/2002 | Davis et al. |

OTHER PUBLICATIONS

Marvin K. Simon, et al., "Spread Spectrum Communications", Computer Science Press, 1885. ISBN 0–88175–017–4, vol. 1, pp. 352–358, vol. 3, pp. 386–398.

Don J. Torrieri, "Principles of Secure Communication Systems", Artech House 1985, ISBN 0–89006–139–4. pp. 212–215, 132, 148–150, 134–145, 92–97.

Kamilo Feher, "Digital Communications: microwave applications", Prentice–Hall Inc, 1981, ISBN 0–13–214080–2, pp. 155, 156–161, 163–165.

European Patent Application No.: 0 629 098 A2—Bishop.

* cited by examiner

PRIOR ART

SYNCHRONIZATION AND ACCESS OF THE NODES IN A COMMUNICATIONS NETWORK

FIELD OF THE INVENTION

The present invention relates to networking in general, and, more particularly, to a technique for establishing and maintaining the synchronization of the nodes in a telecommunications network.

BACKGROUND OF THE INVENTION

One of the fundamental issues in designing a telecommunications network is how to ensure that the nodes in the network are temporally synchronized. If the nodes are not synchronized, communication across the network can be impossible or inefficient, and, therefore, it is essential to ensure that the nodes are synchronized.

In accordance with one technique in the prior art, one node in a network is designated as the "master" node and all of the remaining nodes are, by implication, designated as "non-master" nodes. In accordance with this technique, all of the non-master nodes in the network are synchronized by the master node that transmits a master timing signal to every non-master node, which conforms its own timing to that of the master timing signal. One disadvantage of this technique is that the operation of the entire network relies solely on the integrity of the master node and the master timing signal and if a problem occurs with either the master node or the master timing signal, then the entire network can fail.

In accordance with a second technique in the prior art, two or more nodes in a network are designated as "master" nodes and all of the remaining nodes are, by implication, designated as "nonmaster" nodes. In accordance with this technique, each master node transmits a master timing signal to every other node. Each master node synchronizes its own timing with that of the timing signals it receives from the other master nodes, and each non-master node conforms its own timing to that of the average of all of the master timing signals that it receives.

One advantage of the second technique is that the operation of the entire network does not rely solely on the integrity of a single node, and, therefore, if all but one of the master nodes incurs a failure, the network might survive. One disadvantage of the second technique, however, involves the issue of how each node arbitrates between the respective, and undoubtedly disparate master timing signals. A second, theoretically similar disadvantage of the second technique involves the issue of how each node determines when a master node is malfunctioning and that its master timing signal should be ignored or discounted. A third disadvantage of the second technique involves the issue of how to ensure that each node receives the master timing signal transmitted from each master node. This is of particular importance in wireless networks in which not all of the nodes can necessarily receive a direct transmission from every other node.

In accordance with a third technique in the prior art, each node in a network transmits a timing signal to every other node in the network, and, in such cases, each node conforms its own timing to that of the average of all of the timing signals that it receives. One disadvantage of the third technique is that because of the averaging there are inherent temporal delays in the propagation of timing signals, and, therefore there is inherently feedback in the system. Depending on the topology of the network and other technical factors, this feedback could cause the network timing to become unstable, which might cause the network to fail.

In accordance with a fourth technique in the prior art, each node in a network comprises a satellite positioning system receiver (e.g., a Global Positioning System or "GPS" receiver) and each node conforms its own timing to that of the satellite positioning system. One advantage with the fourth technique is that there is no feedback in the system, and, therefore, the network timing is stable. One disadvantage with the fourth technique is that, in some applications, it can be prohibitively expensive to include a satellite positioning system receiver with each node.

Therefore, the need exists for a technique for temporally synchronizing the nodes in a telecommunications network.

SUMMARY OF THE INVENTION

The present invention provides a technique for temporally synchronizing the nodes in a telecommunications network without some of the costs and disadvantages of techniques in the prior art. Furthermore, the present invention provides a flexible access method that enables the data transfer rate and modulation scheme between any pair nodes to be changed, in real-time, to accommodate the needs of that pair of nodes.

In particular, the present invention relies on the understanding that some synchronization techniques in the prior art are both: (1) unnecessarily demanding in some respects, and (2) insufficiently demanding in other respects, so to achieve a high degree of synchronization.

First, some prior art techniques are unnecessarily demanding because they require that every node in a network be synchronized with every other node in the network. The present invention is based on the understanding that it is only necessary that each node in a network be synchronized with those nodes in the network with which it directly communicates.

Second, some prior art techniques are insufficiently demanding because they do not explicitly require that each pair of directly communicating nodes be well-synchronized. Instead, they assume that each pair of directly communicating nodes are well-synchronized when the network as a whole displays some level of synchronization. The present invention is based on the understanding that the best way to ensure that each pair of directly communicating nodes are well-synchronized is to explicitly synchronize each pair of directly communicating nodes for each uni-directional channel, regardless of the synchronization of any other nodes in the network. In other words, each uni-directional channel between two nodes is given its own synchronization that is independent of the other channels.

Therefore, in accordance with the illustrative embodiment of the present invention, each node comprises: (1) a master clock, and (2) a temporal tracking mechanism. The master clock runs free (i.e., no attempt is made to conform the timing of the master clock to the timing of any other node in any way), and is used to determining when all transmissions occur by that node. The temporal tracking mechanism tracks the timing of the transmission of all transmissions that are made by other nodes that are intended to be received directly by the node. In other words, if there are n other nodes that transmit directly to the node of interest, the temporal tracking mechanism maintains n separate and distinct time tracks, one for each of the other nodes that directly transmits to it.

To reiterate, in accordance with the present invention, there is: (1) no master clock for the network, (2) no virtual master clock for the network, (3) no master clock for both the transmissions and receptions within a single node, and (4) no master clock for received signals from a plurality of nodes. This is a radical departure from the prior art in many respects.

Although the synchronization problem exists for all networks using all different kinds of technology, it is of particular interest in wireless networks that employ frequency hopping. The advantages of frequency hopping (e.g., resistance to interference, resistance to multipath fading, etc.) are well-known to those skilled in the art and are increasingly attractive to network designers.

In a frequency-hopping network, the communications between nodes is accomplished by transmitting a modulated carrier and by periodically changing the frequency of the carrier in accordance with a predictable sequence. If the receiver knows the sequence and is properly synchronized with the transmitter, the receiver can change the reception frequency in unison with the changing of the transmission frequency by the transmitter. If the transmitter and the receiver lose synchronization, communication between them might be precluded.

The illustrative embodiment of the present invention recognizes that the proper synchronization of the nodes in a frequency-hopping wireless network is not evinced by all of the transmitters hopping in unison, but rather by having each transmitter/receiver pair hop in unison. In accordance with the illustrative embodiment, the transmitters in each node are not expected to hop in unison, nor is there any desire that they do so. Instead, each node's temporal tracking mechanism discovers and follows the hopping of each associated transmitter.

When each node's transmitter hops independently of every other node's transmitter, and according to a frequency sequence that is orthogonal to the frequency sequence used by the other nodes, communications can occur simultaneously between multiple pairs of nodes. This is additionally advantageous because it eliminates the need to arbitrate between the nodes, which creates an advantageous access method that uses the network bandwidth efficiently.

In addition, two or more wireless networks operating in close proximity can operate without prior understanding or agreement on hoping sequence management.

When communications can occur simultaneously between multiple pairs of nodes, each channel's communications parameters can be adjusted to suit the needs of that channel. For example, a more complex modulation scheme that provides a high data rate might be used when the nodes are closer, and another modulation scheme that provides a low data rate might be used when the nodes are far away. It should be understood that this can occur between any two nodes and does not affect the other nodes or the operation of the remainder of the network. The variable data rate in conjunction with multiple communications that can occur at the same time vastly increases, in aggregate, the network capability to transfer data between all the nodes.

Furthermore, some nodes might not need the receiver at all. Still they might be part of the network providing data to other nodes. For example, a temperature sensor, a pollution sensor, a motion detector, etc., can provide data to the network using the same synchronization method as all the other nodes. Thus such synchronization method makes it possible for three kinds of nodes to coexist: (a) with transmitter and receiver, (b) with receiver only, (c) with transmitter only.

An analogy, albeit an imperfect one, might help to facilitate and understanding of the illustrative embodiment of the present invention. A traditional network that attempts to synchronize all of the nodes in the network is like a lecture hall in which the professor decides who can speak and when. When one person speaks, others (mostly) listen. Although it is true that the students can be divided into smaller groups to work on separate tasks, but the process of separation, combining, and especially cooperation in the groups is never trivial.

On the other hand, the illustrative embodiment of the present invention is more analogous to a cocktail party at a United Nations sponsored event. In the same room, many participants can carry multiple conversations that can start and stop at will. Furthermore, each group of people can use a different language, and perhaps switch between languages as is convenient. In general, more information can be exchanged, in total, by all of the participants in the latter case than by all of the students, in total, in the former case.

All the above aspects combine in that, the network capacity is increased while the management is simplified and robustness and flexibility are dramatically improved. The synchronization of the network is improved, the master network timing problem is completely eliminated, and the access method is greatly simplified while the possibility for contentions is greatly reduced. In all, the features of the present invention make this synchronization and access method attractive in many important applications such as, for example, home networking, office networking, industrial, office and home automation systems, etc. For example, in a home networking application, there might be several systems combined including burglary alarm, comfort control and home computer network.

According to the first illustrative embodiment of the present invention, there is provided a method that eases tracking of multiple nodes' transmitters by each receiver. The method is based on each transmitter transmitting beacon timing signals at certain varied intervals and varied frequencies. For the purpose of this specification, a "beacon timing signal" is defined as a transmission by a node's transmitter that can be used by a receiver for obtaining and maintaining synchronization with that node's transmitter. The variations are performed according to a time-frequency sequence that is unique for each transmitter. In addition, the time-frequency sequences used by different transmitters are orthogonal. The receiver replicates the hopping pattern for each transmitter and tunes to the appropriate frequency at the appropriate time to receive the beacon timing signal and, if necessary, adjust its timing for that transmitter. The receiver computes and stores the expected time and frequency of the next beacon transmission for each tracked transmitter. A discrepancy between the expected and actual time of the transmission is used to compute the next transmission time.

According to the second illustrative embodiment of the present invention, there is provided a method to initiate the transmission as soon as required without waiting for the next due time for the beacon. The method is based on establishing multiple transmission opportunities between each beacon's timing signals. A transmission opportunity is combination of a time and a frequency at which the transmitter might transmit a request for access. For example, a beacon's timing signals might be transmitted every 10 seconds and the transmission opportunities for that beacon might be established every 200 ms. This way, the access transmission will have maximum 200 ms latency. Advantageously, the opportunities are established in reference to the beacon timing signals. The time and frequency for the opportunities are also varied according to a time-frequency sequence that is also unique for each transmitter and orthogonal with other transmitters. The receiver that tracks a transmitter examines each transmission opportunity from each transmitter in addition to the beacon timing signals. According to the present embodiment, the time-frequency variations for the transmission opportunities and for the beacons are related so that they can be developed from the same orthogonal sequence. Advantageously, the beacon timing signals are based on the decimation of the sequence that is used for the transmission opportunities.

According to another aspect of the illustrative embodiment, there is provided a simple method to generate a large number of time-frequency orthogonal sequences and a decimation method to maintain orthogonality. The method is based on generating a pseudo noise (PN) sequence and processing the PN sequence according to selected bits of the transmitter identification code. First, the PN sequence is processed by a first group of selected bits of the transmitter identification code, and the result is used to determine the transmission frequency. Then the PN sequence is shifted according to a second group of selected bits of the transmitter identification code. The shifted PN sequence is processed by a third group of selected bits of the transmitter identification code, and the result is used to determine the time variations. If the identification codes are different the resulting time-frequency sequences are orthogonal upon any cyclic shift.

According to another aspect of the illustrative embodiment, there is provided a method for initial synchronization of a new node that is added to the network or for a power-up synchronization. The method is based on transmitting, by the new node, beacon timing signals at an increased rate. In addition, the first node that receives a beacon transmission broadcasts to other nodes the information about the new node and its timing. According to the present embodiment, such timing information simply means the computed time of the next beacon transmission from the new node relative to the receiving node transmitter timing. In addition, the network node, sends information to the new node about all the transmitters that this node is tracking.

According to another aspect of the illustrative embodiment, the beacon timing signals contain information that identifies the transmitting node time-frequency sequence, thus making it possible to synchronize and communicate with a new node that is not known a priori to the receiving node. Advantageously, in the illustrative embodiment, the time-frequency sequence is determined entirely by the node identification number. Since the identification number is always required, the beacon timing signals do not need to contain redundant bits to convey the sequence information.

DETAILED DESCRIPTION

Figure 1A:
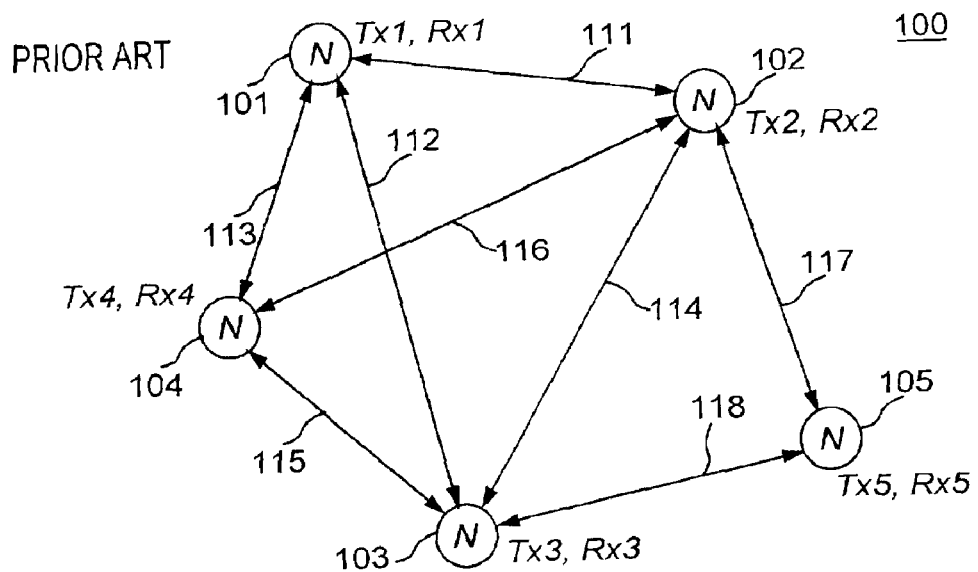
FIG. 1a is an example of a network according to prior art.

FIG. 1a depicts a graph of an illustrative network 100 in the prior art that comprises five nodes, Node 101 through Node 105, respectively. As the topology of FIG. 1a suggests, not all of the nodes can communicate with each other directly; only those nodes that are connected by one of paths 111 through 118 can communicate directly. For example, node 105 cannot communicate with node 101 directly, but only indirectly through other nodes. In accordance with the prior art: (1) each node is capable of bi-directional communication between two nodes, (2) a node can broadcast to one or more nodes simultaneously, and (3) the nodes use frequency hopping and wireless technologies to communicate amongst themselves.

Figure 1B:
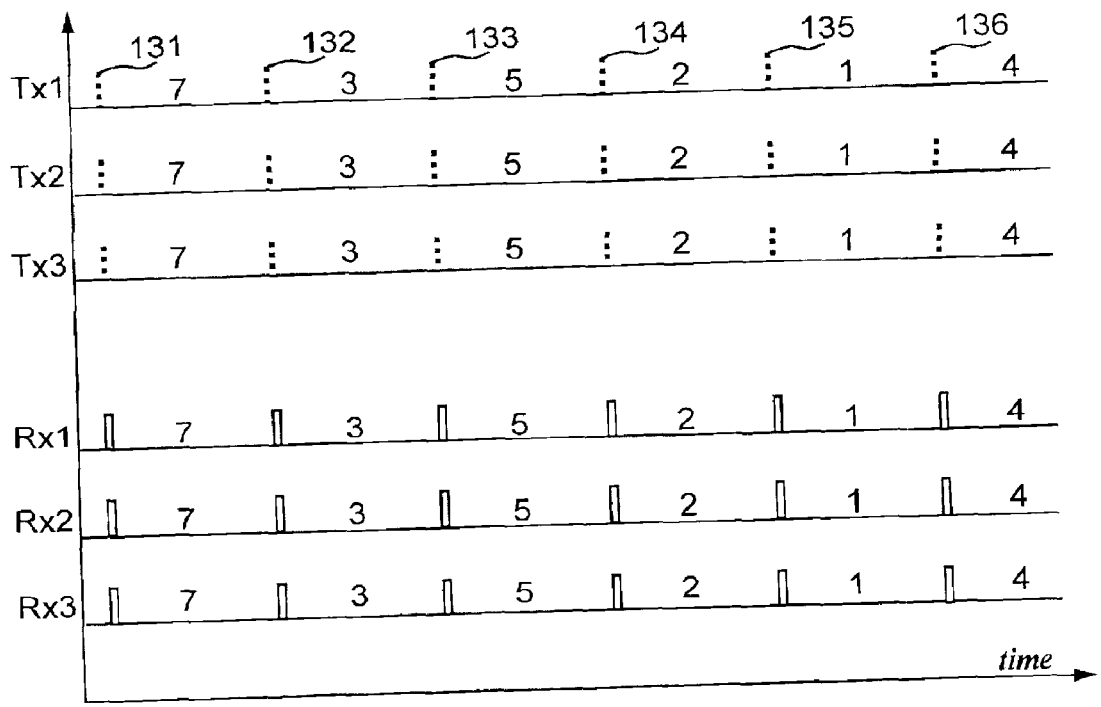
FIG. 1b is an example of operation in a synchronized network according to prior art.

FIG. 1b depicts a graph of the timing of the transmissions amongst three of the nodes in FIG. 1a: node 101, node 102 and node 103. When network 100 is synchronized, all of the transmitters hop (i.e., change their respective transmission frequency) and all of the receivers hop (i.e., change the frequency on which they are looking for a transmission) at the same time.

For example, as shown in FIG. 1b, node 101, node 102 and node 103 all change their transmission frequency in accordance with the pattern whose fragment {7, 3, 5, 2, 1, 4} is shown to occur at instants 131 to 136, respectively. Likewise, node 101, node 102 and node 103 all change their reception frequency in accordance with the same pattern and at the same time.

In accordance with the operation of network 100, all of the nodes communicate via the same physical channel (i.e,. they all use the same frequency, bandwidth and modulation at the same time) and the transmissions that emanate from each node are broadcast to all of the nodes within range. In order for one node to send information to another specific node, the information must be addressed, or a protocol must be used that partitions the physical channel into logical channels. One method for doing this that is well-known in the art is to use time-division multiplexing. When a physical channel is partitioned into logical channels, each pair of nodes can create and discard logical channels between them as needed.

In accordance with the operation of network 100, each node can start transmission at any time according to prescribed protocol at the frequency that is the same for all nodes during the time between the consecutive hops.

Figure 2A:
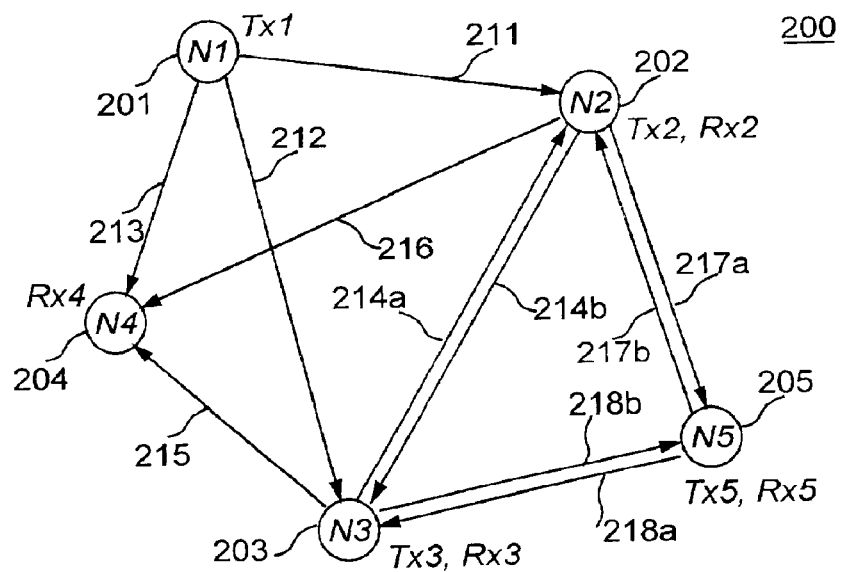
FIG. 2a is an example a network according to an advantageous embodiment of the present invention.

Referring to FIG. 2a, there is shown an example of the network according to the present invention. In the example, the network has five nodes, but not all nodes are equipped to carry bi-directional communications. Nodes N2 202, N3 203 and N5 205 are bi-directional, node N1 101 is transmit only, and node N4 204 is receive only. Accordingly, paths 211, 212, and 213 emanate from node N1; paths 213, 215, and 216 are toward node N4; and paths 214a, 214b, 217a, 217b, 218a and 218b are shown as double lines where each line points one way for the reasons explained later.

Figure 2B:
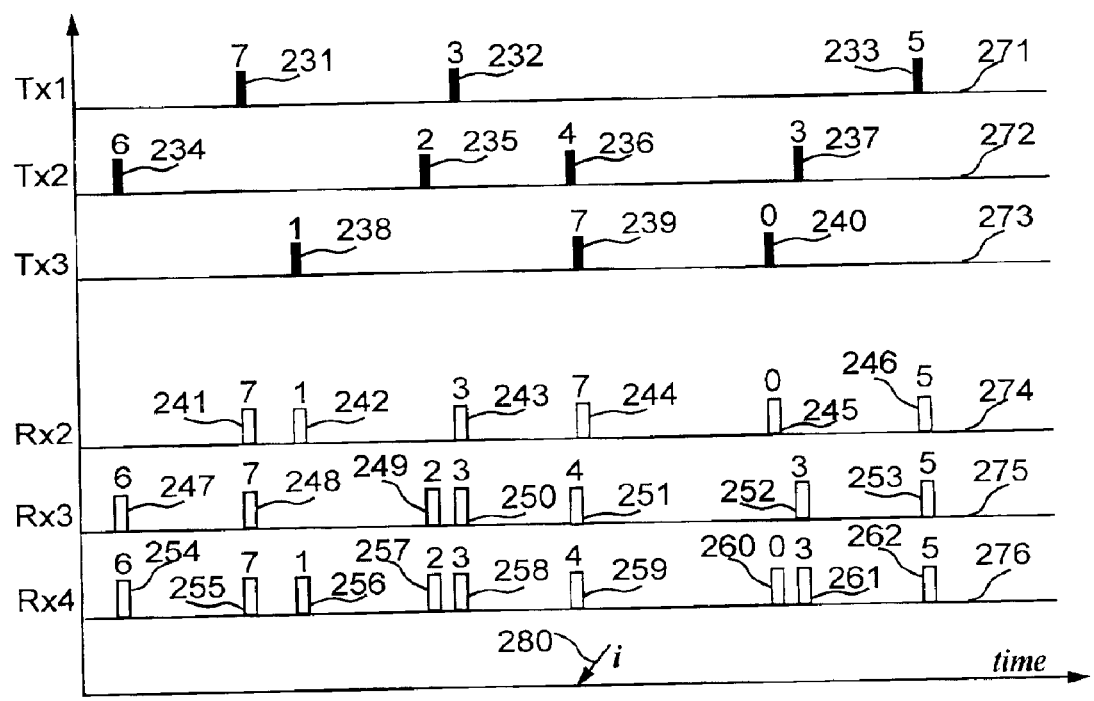
FIG. 2b is an example of operation in a synchronized network according to an advantageous embodiment of the present invention.

Referring to FIG. 2b, there is shown an example of network operation according the present invention. There is shown operation of transmitters of nodes N1, N2, and N3, and the operation of receivers on nodes N2, N3, and N4. According to the advantageous implementation, the transmitter Tx1 of node N1, hops independently of other transmitters and transmits short "beacon timing signals" 231, 232, 233 after each hop. Similarly, transmitter Tx2 of node N2 hops and transmits beacon timing signals 234, 235, 236, and 237; and transmitter Tx3 of node N3 hops and transmits beacon timing signals 238, 239 and, 240. The transmitter Tx1 hops according to a pattern 271 that is different from the pattern 272 of the transmitter Tx2, and from the pattern 273 of transmitter Tx3. For example, the fragments of the hopping patterns shown in the figure are { ... 7, 3, 5 ... } for Tx1, { ... 6, 2, 4, 3 ... } for Tx2, and { ... 1, 7, 0 ... } for Tx3. The numbers indicate the frequency indexes that determine the frequency channels.

In addition, it is also evident that the hops and beacon timing signals do not occur at regular intervals. Instead, the intervals are varied according to a time pattern that is also different for different transmitters.

The receivers Rx2, Rx3, and Rx4 of the nodes N2, N3 and N4 accordingly, operate as follows. Each receiver hops so that it can receive the beacon timing signals from all the transmitters that is tracks. For example, receiver Rx2 hops to "catch" the beacon timing signals from transmitters Tx1 and Tx3. Consequently, it tunes to the frequency of beacon timing signals from transmitter Tx1 during the time windows 241, 243 and 246; and it tunes to the frequencies of beacon timing signals from transmitter Tx3 during the time windows 242, 244, and 245. Similarly, receiver Rx3 hops to catch the beacon timing signals form transmitters Tx1 and Tx2. Therefore, it tunes to the frequency of beacon timing signals from transmitter Tx1 during the time windows 248, 250, and 253; and it tunes to the frequency of beacon timing signals from transmitter Tx2 during the time windows 247, 249, 251 and 252. Finally, the receiver Rx3 hops to catch the transmissions from all three transmitters Tx1, Tx2, and Tx3. Therefore, the receiver Rx3 hops to the frequencies of the transmitter Tx1 during the time windows 255, 258, and 262; it hops to the frequencies of the transmitter Tx2 at the instants 254, 257, 259 and 261; and it hops to the frequencies of the transmitter Tx3 during the time windows 256, and 260.

Of course, in order to accomplish the required hopping, the receivers must replicate the hopping pattern for each transmitter they track, and compute the time and frequency for the next beacon timing signals. In addition, the receiver must compensate for the timing slippage that occurs between a transmitter and the receiver. Since the slippage is different for each transmitter, the receiver must separately compensate for the slippage for each transmitter.

The question might be asked, at this point, how the beacon timing signals affect the network, and in particular, how much overhead they introduce and how much unnecessary spectral "pollution" they introduce. In order to minimize the negative impact, the average interval between transmissions is selected to be very large. For example 5 to 10 seconds might be acceptable. This is because, the main function of the beacon timing signals is the timing maintenance. If the receiver and transmitter time bases are adequately stable and the resulting slippage is very slow, such rare beacon timing signals are perfectly adequate. Providing that the beacon transmission takes 1 ms, and there are 100 nodes in the network using 100 hopping frequencies, the total overhead is 0.01% to 0.02%. This does not include the fact that the nodes that are close in proximity might exchange data at a higher speed and that the nodes that are far away might reuse the same frequencies. If this is included in the calculations, the overhead is even smaller.

Another important questions that might be asked at this point is this: if the receivers must hop all the time to receive beacon timing signals from many transmitters, then how a transmitter can initiate a transmission; does it have to wait until the next beacon transmission?

In order to facilitate a faster response to the transmissions needs, the following concept has been developed.

Figure 3A:
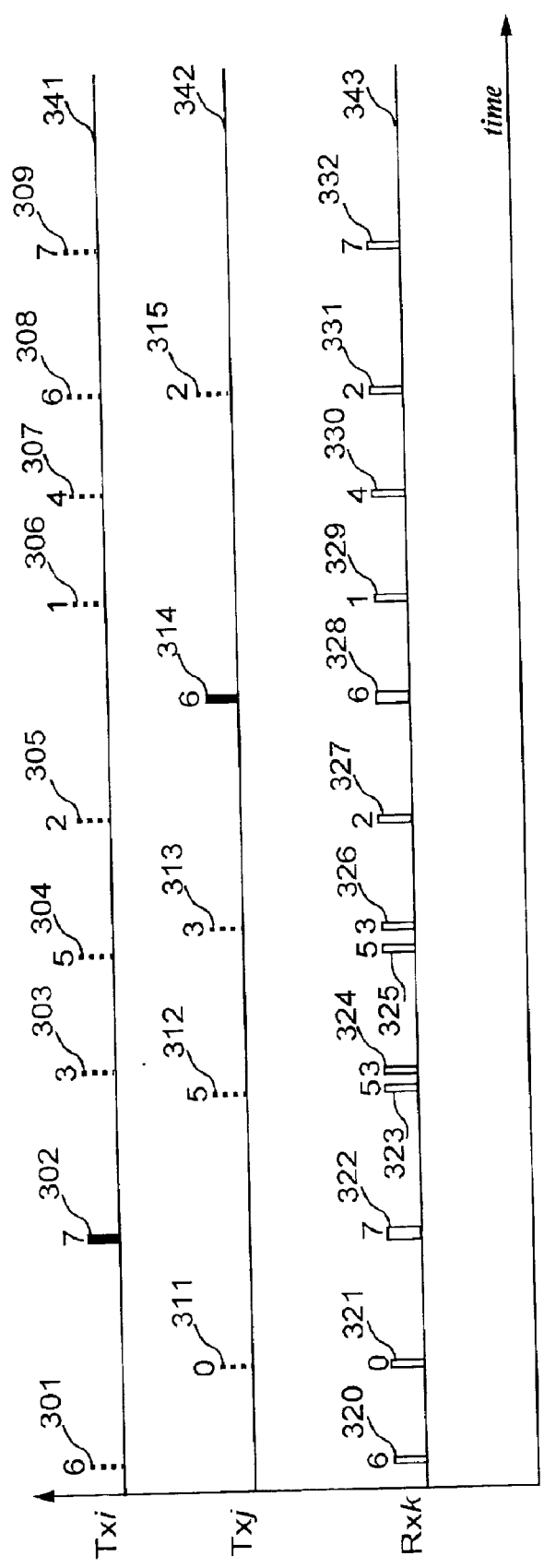
FIG. 3a is an illustration of transmission opportunities according to an advantageous embodiment of the present invention.

Referring to FIG. 3a, in accordance with advantageous implementation of the present invention, each transmitter establishes "transmission opportunities" between each two consecutive beacon timing signals. When a transmitter needs to transmit data before the next beacon transmission, it transmits at the next transmission opportunity. In turn, each receiver that tracks this transmitter, examines the transmission opportunities for pending transmissions. For example, while the beacons are transmitted at 10 second intervals, the opportunities might be created at 200 ms intervals. This way the transmitter needs to wait no more than 200 ms before it can establish communications. Advantageously, the transmission opportunities are also determined based on time-frequency hopping sequence. This way, they experience the communications advantages of the frequency hopping technique.

For the purpose of this specification, the term "transmission opportunity" is defined as: (i) time, or (ii) frequency, or (iii) code, or (iv) any combination of (i), (ii), and (iii) at which a transmission might occur.

Accordingly, in FIG. 3a, the transmitter Txi, besides transmitting beacon transmission 302 at frequency index 7, also establishes transmission opportunities 301, 303, 304, 305, 306, 307, 308, and 309 at frequency indexes 6, 3, 5, 2, 1, 4, 6, and 7 accordingly. Similarly, transmitter Txj transmits beacon timing signals 314 and in addition establishes transmission opportunities 311, 312, 314, and 315 at frequency indexes 0, 5, 3, and 2 accordingly. The receiver Rxk, hops to catch the beacon timing signals during the time windows 322 from transmitter Txi and 328 from transmitter Txj. In addition, the receiver examines each transmission opportunity from each transmitter: in time windows 320, 324, 325, 327, 329, 330, and 332 from transmitter Txi, and in the time windows 321, 323, 326 and 331 from transmitter Txj.

It should be pointed out that at the instant 331 there exist two opportunities: one established by transmitter Txi at frequency 6, the other established by transmitter Txj at frequency 2. The receiver must arbitrate which opportunity to examine, for example, based on the past examined opportunities or probability of traffic from each transmitter. Alternatively, the receiver might be equipped with two or more circuits to receive at more than one frequency at the same time.

In accordance with another aspect of an advantageous implementation, the time-frequency patterns of the transmission opportunities and the beacon timing signals are related. Again, referring to FIG. 3a, the frequency sequence used by the transmitter Txi is { ... 6, 7, 3, 5, 2, 1, 4, 6, 7, ... }. The beacon transmission occurs at frequency 7, after which the next frequency is used for the next transmission opportunity. This way, the basic sequence is used for both the transmission opportunities and the beacon timing signals. The beacon frequencies are established simply by decimating the basic sequence. In this regard, the beacon transmission appears at one of the transmission opportunities.

In general, if the basic sequence length is N, and the beacon timing signals are performed every M*N+1 transmission opportunities, then the beacon transmission will occur at the same frequency pattern as that established by the basic sequence.

In a similar way, the time hopping is introduced into the transmission opportunities. The time hoping advantage is evidenced by the preceding example of temporal coincidence of two opportunities. The coincidence was not present at the next opportunity due to the time hopping.

Although there might be developed several ways of establishing the time-frequency hopping along with ways for relating the transmission opportunities and beacon transmission, the decimation method is advantageous for its elegance and ease of implementation.

Figure 3B:
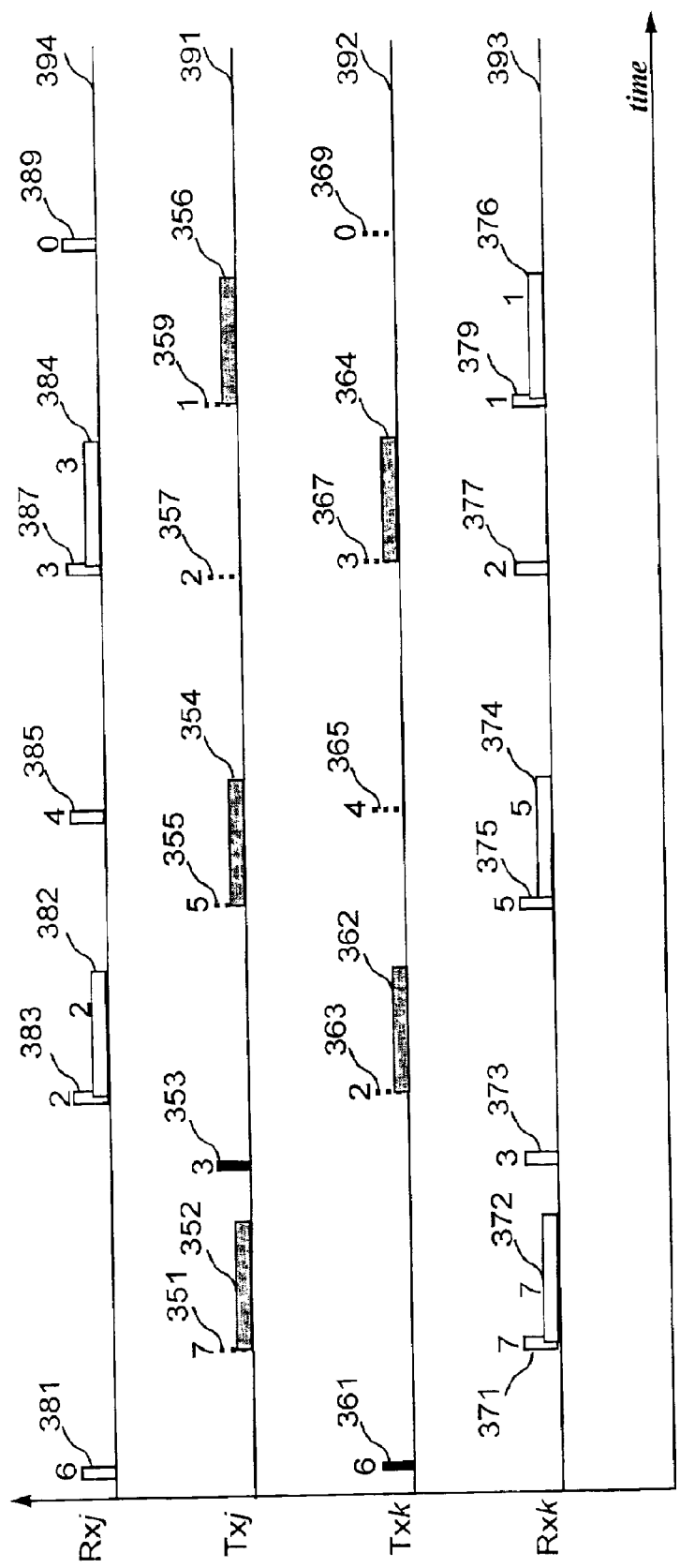
FIG. 3b is an illustration of data exchange using transmission opportunities according to an advantageous embodiment of the present invention.

Referring to FIG. 3b, there is shown an example of communications between two nodes operating in accordance with an exemplary implementation of the present invention; one node Nj with transmitter Txj and receiver Rxj, the other node Nk with transmitter Txk and receiver Rxk. The transmitter Txj activities 391 involve transmitting a beacon transmission 353 and establishing transmission opportunities 351, 355, 357, and 359. In addition, the transmitter Txj transmits data packets 352, 354, and 356 at its transmission opportunities 351, 355, and 359 respectively. Similarly, the transmitter Txk activity 392 includes transmitting beacon transmission 361 and establishing transmission opportunities 363, 365, 367, and 369. In addition, the transmitter Txk transmits data packets 362 and 364 at its transmission opportunities 363 and 367 accordingly.

The receiver Rxk activity 393 includes examining the transmission opportunities of the transmitter Txj in the time windows 371, 373, 375, 377, and 379. In addition, the receiver Rxk receives beacon in time interval 373 and packets in time intervals 372, 375, and 376. Similarly, the receiver Rxj activity 394 includes examining the transmission opportunities of the transmitter Txk in the time windows 381, 383, 385, 387, and 389. In addition, the receiver Rxj receives a beacon transmission in the time interval 381 and packets in the time intervals 382, and 384.

The node Nj initiates transmission by transmitting packet 352 via its transmitter Txj. The packet is received by the receiver of the node Nk, that subsequently, transmits packet 362 via its transmitter Txk. This packet is received by the receiver of the node Nj that, in turn, responds with packet 354. The node Nk responds with packet 364 and the node Nj with packet 356. This exchange can continue as long as the nodes have data to communicate.

It is apparent that both transmitters utilize separate hopping patterns in the exchange. This is the reason that the communications links in FIG. 2b are shown as double lines that point in one direction.

Also, each transmitter does not neglect the beacon timing signals during the data exchange.

At this point it is worth mentioning, that the data exchange does not need to be limited to the transmission opportunities. In fact, once two nodes establish that they desire to communicate, they might use all the time between the transmission opportunities and the responses might be immediate. In such case, they might use, for example, the frequency of the last transmission opportunity in the time interval between the last and the next transmission opportunities. An advantageous implementation might use different hopping patterns and shorter time between transmission opportunities. Also the exchange might be simultaneous in both direction since the transmitters use different frequencies. There can be many variations to obtain various advantages without departing from the spirit of the invention.

Figure 3C:
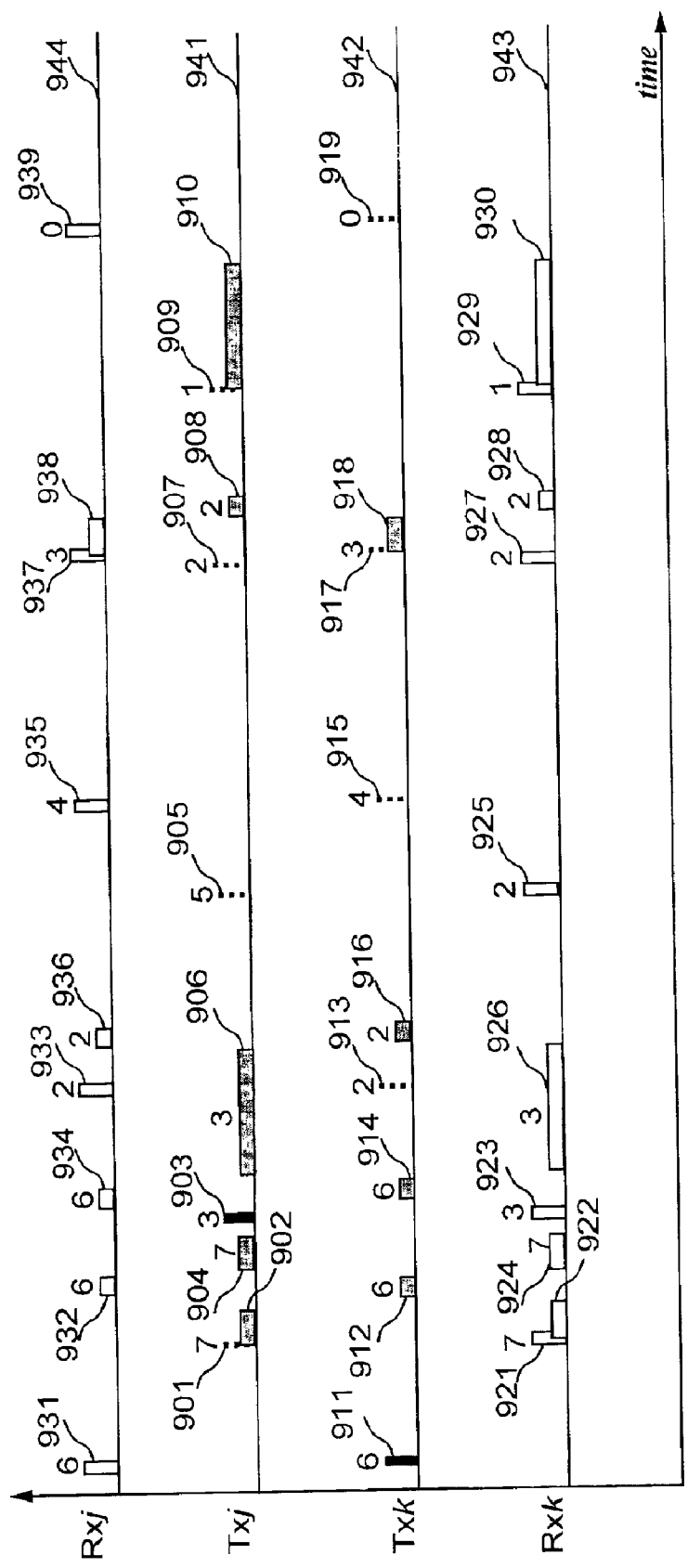
FIG. 3c is an illustration of data exchange using transmission opportunities according to another advantageous embodiment of the present invention.

For example, FIG. 3c shows data exchange according to another advantageous implementation. Accordingly, the transmitter Txj activities 941 include transmission opportunities 901, 905, 907, and 909; beacon transmission 903 and packets 902, 904, 906, 908 and 910. The transmitter Txk activities include transmission opportunities 913, 915, 917, and 919; beacon transmission 911 and packets 912, 914, 916, and 918. The receiver Rxk activities 943 include examining transmission opportunities at the time windows 921, 925, 927 and 929; receiving beacon at the time interval 923 and packets at the time intervals 922, 924, 926, 928, and 930. The receiver Rxj activities 944 include examining transmission opportunities at time windows 933, 935, 937, and 939; receiving beacon transmission at the time interval 931 and packets at time intervals 932, 934, 936, and 938.

The exchange is initiated by the transmitter Txj by seding packet 902 starting at the transmission opportunity 901 (using frequency index 7). The receiver Rxk immediately responds with the packet 912 (using frequency index 6). The transmitter Txj immediately responds with packet 904, and the transmitter Txk responds with pactet 914, but with a short pause due to the scheduled transmission of beacon 903 by the transmitter Txj. The exchange continues with more data send by the transmitter Txj in the packet 906 and the transmitter Rxk responding with packet 916 (using frequency index 2 after scheduled transmission opportunity 913). A few moments later, the transmitter Txk initiates data transfer by transmitting packet 918 starting at the transmission opportunity 917. The transmitter Txj responds immediately with packet 908 and later with another packet 910 that starts at the next transmission opportunity 909.

It is apparent, that an efficient data exchange can be designed using this approach since only the first packet that initiates the exchange must appear at the transmission opportunity. The following packets can be transmitted immediately using a predefined protocol.

Figure 3D:
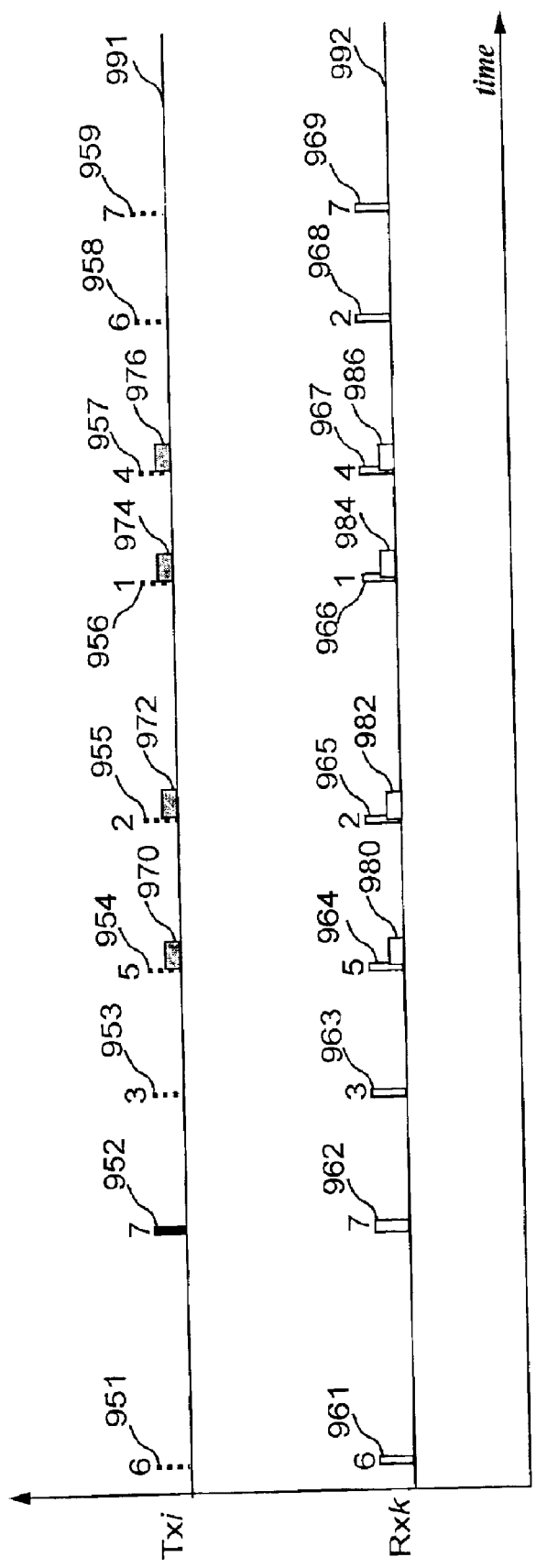
FIG. 3d is an illustration of data exchange using transmission opportunities according to yet another advantageous embodiment of the present invention.

FIG. 3d shows yet another example of data transmission in an advantageous implementation of a network according to the present invention. This time the node i is unidirectional: it can transmit but it cannot receive. The transmitter Txi activities 991 include transmission opportunities 951, 953, 954, 955, 956, 957, and 959; beacon transmission 952 and packets 970, 972, 974 and 976. The receiver Rxk that tracks the transmitter Txi examines the transmitter opportunities in the time windows 961, 963, 964, 965, 966, 967, 968 and 969; receiving beacon transmission at the time interval 962 and packets 980, 982, 984, and 986. Since there are no packets acknowledging correct reception, each message that the transmitter Txi needs to send to the receiver Rxk may need to be transmitted several times. Since each packet is transmitted at different transmission opportunity each having different frequency index, the probability is increased dramatically that at least one packet reaches the receiver. This is especially advantageous for wireless communications where multipath fading and interference can often preclude transmission at one or more frequencies.

At this point another question begs for an answer, that is, how a node synchronizes on power-up?

One might be inclined to think that a node that is just powered up needs to listen to the network first. However, in this case, the situation is reversed. It is the network that needs to synchronize with a new node. Upon a power-up, the node immediately starts transmitting beacon timing signals. However, advantageously, the transmissions are at smaller than usual intervals and they are much longer. This way, the probability is increased that one or more network receivers that continuously search all the frequency channels, receive a beacon transmission. When a network node receives a beacon from the powered-up transmitter, its receiver immediately synchronizes with the new transmitter and follows its beacon hopping. In addition, the network node broadcasts a message to other nodes indicating that a new transmitter is present. The message contains hopping pattern information of the new transmitter and its time and frequency coordinates relative to the broadcasting transmitter. The message might be rebroadcast by other nodes with appropriate changes reflecting different time reference of each broadcasting transmitter. Following the broadcasting of the first message, the network node that first synchronized with the new node, transmits a message to the new node using the new node transmitter pattern immediately following the new node transmission opportunities. Once the new node receives the message, an information is exchanged. The network node furnishes the new node with the time-frequency coordinates and hopping patterns for all the nodes that it presently tracks. Then the new node can immediately synchronize with all these nodes provided that they are within communications range. Having done this, the new node can interrogate these nodes and ask for the time-frequency coordinates of the transmitters they are presently tracking. This process can continue until the new node has the necessary information about all the nodes that are close enough for reliable communications.

This way, the new node is synchronized with the entire network in a very short order. The required time depends mostly on the new node. Since the data exchange is relatively fast, most of the acquisition time is due to the relatively low probability of detection of a single beacon transmission that last a short time on one of many possible frequency channels. Therefore, more frequent and longer beacon timing signals will ensure faster synchronization. Depending on the desired speed of synchronization, various nodes may use different power-up beacon parameters.

It should be added that this form of synchronization can be performed at any time, not only during power-up. I.e. a node may periodically enter the mode of frequent beacon transmissions to regain synchronization after a failure.

In order to facilitate instant synchronization upon a single reception of a beacon transmission, each beacon transmission includes an information about the hoping sequence used by the transmitter. The efficient manner of inclusion of such information will be detailed later.

In an advantageous implementation, the power-up beacons include also a counter that indicates how many more beacons in this mode will be transmitted before a normal beacon timing signals start. This allows the tracking receivers to compute the next first normal beacon transmission just after a first reception of a single power-up beacon.

In cases when a node has only a transmitter, the transmitter performs power-up transmissions of beacons as previously described.

In case of a receiver only node, the receiver must synchronize with the transmitters of the network nodes without transmitter assistance. In such case, the acquisition might be much longer.

In the advantageous embodiment, the sequence in which the frequencies are used is different for different transmitters. The following is the description how this is accomplished in the advantageous embodiment. Each transmitter includes a pseudo random sequence generator or pseudo noise—PN generator, wherein a pseudo random sequence generator is based on a linear feedback shift register, and wherein some outputs of the shift register are fed back to an EX-OR (Exclusive OR) gate whose output is connected to the register input. For a certain combination of the outputs that are fed to the EX-OR gate, the shift register can produce a sequence that has $2^N-1$ bits, wherein N is the length of the shift register. Such a sequence is called a maximum length sequence. Alternatively, if all the outputs of the shift register are taken at a time, then a pseudo random sequence of $2^N-1$ numbers is created, wherein all the numbers have N digits and each number differs from all the other numbers in the sequence; the numbers range from 1 to $2^N-1$. For example, a generator based on a 3-bit shift register produces a sequence consisting of 7 3-bit numbers. The numbers range from 1 to 7. Such PN generators are well known to the skilled in the art.

Figure 4:
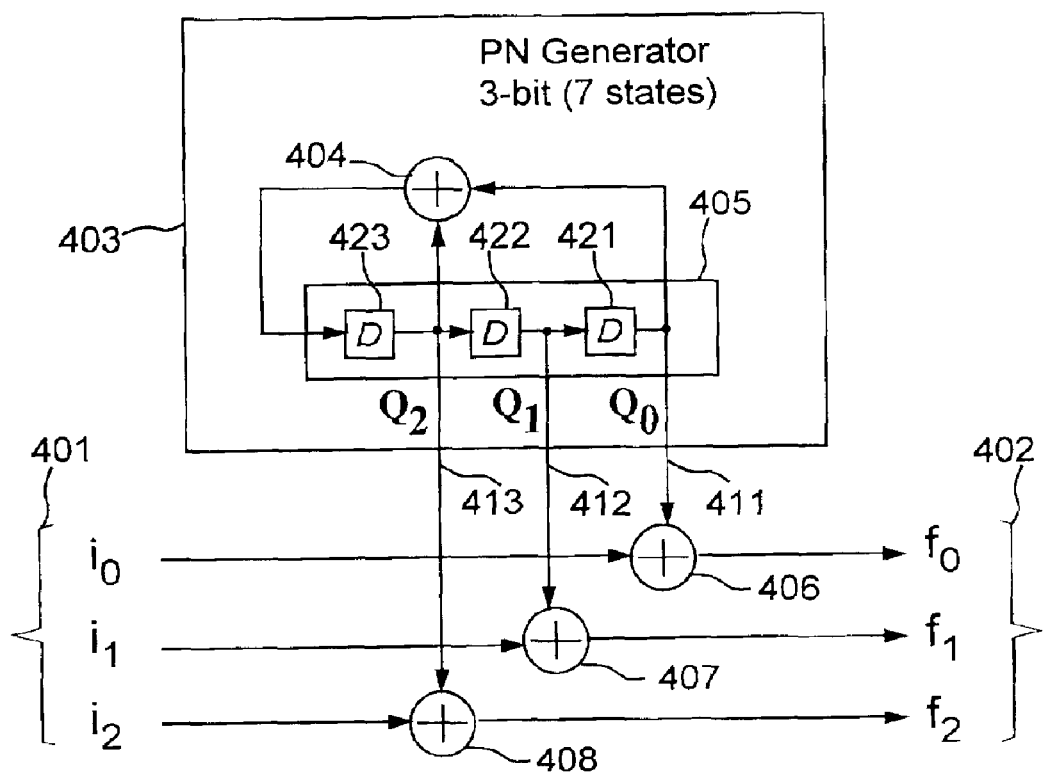
FIG. 4 is a block diagram of an example of illustrative embodiment of a sequence generator used to determine the individual frequency sequences.

Referring to FIG. 4, the pseudo random sequence generator 403 consists of a shift register 405 and EX-OR gate 404. The shift register 405 is composed of three stages 421, 422, and 423 having three outputs $Q_0$ 411, $Q_1$ 412 and $Q_2$ 413 respectively. The feedback is taken from outputs $Q_0$ and $Q_2$. The three least significant bits of the transmitter ID $\{i_2, i_1, i_0\}$ 401 are combined with the output of the pseudo random sequence generator $\{Q_2, Q_1, Q_0\}$ using EX-OR gates 408, 407, and 406. The result can be used to indicate the frequency or frequency channel or frequency index $\{f_2, f_1, f_0\}$ 402 indicative of the frequency over which the transmission will occur.

Assuming that the initial state of the shift register is binary 111 (decimal 7; $Q_2=1$, $Q_1=1$, $Q_0=1$), the produced sequence is $\{7, 3, 5, 2, 1, 4, 6\}$. These numbers are then combined with the last three bits of the transmitter ID using bit by bit EX-OR operation; i.e. the last bit of the transmitter ID ($i_0$) is combined with the last bit of the random number ($Q_0$), etc. This way produced new sequence has numbers ranging from 0 to 7 the order of which depends on the last three bits of the transmitter ID. Thus, 8 distinct (permuted) sequences of numbers are created.

For example, if the last digits of the transmitter ID are 000, then the frequencies are selected in the order 7, 3, 5, 2, 1, 4, 6, i.e. the sequence is not altered. If the last three digits of the transmitter ID are 001, then the frequencies are selected in the order 6, 2, 4, 3, 0, 5, 7; if the last three digits of the transmitter ID are 010, then the frequencies are selected in the order 5, 1, 7, 0, 3, 6, 4; etc. Notice, that each newly created sequence is not, strictly speaking, a permutation of the basic sequence because in each new sequence one number is converted to 0; e.g. in the first example 1 was converted to 0 in the process, in the second example 2 was converted to zero. However, for the purpose of this application the operation is regarded and called a "permuting operation" or a "permutation", or "permutation process", etc. Similarly, the resulting sequence is called "permuted sequence".

In the illustrative embodiment, the sequence length depends on the number of frequencies used by the system. For example, if the available bandwidth is 26 MHz and the frequencies are separated by a 100 kHz interval, then there are 260 frequencies—channels available for transmission. I.e. the sequence length can be 255 by using an 8-bit shift register. By processing the output of the PN generator with 8 transmitter ID bits, a 255 different frequency sequences are obtained.

It is apparent that any two sequences are quite different even though the ID number is changed only on one position. In fact, the sequences are orthogonal, i.e., for any two sequences, a coincidence of two numbers occurs only once for the entire period of the PN generator.

This is advantageous since it lowers the probability of persistent collisions that might happen if two or more transmitters transmit at the same time and at the same frequency for a prolonged time. It should be stressed that using the sequences as described ensures that the persistent collision between any two transmitters is not possible since the frequencies in any arbitrary pair of sequences do not, coincide persistently regardless of the relative shift of the sequences.

For each transmitter, the future frequency can be predicted based on just one partially received message because each message includes the transmitter ID based on which the receiver can determine the content of the frequency index generator. To see how this can be done one needs to notice that the permutation process according to the illustrative embodiment is reversible: i.e., if the same ID digits are applied again to the frequency index, the PN generator state is obtained. If the receiver receives a least a part of a message from a transmitter, the frequency index is known. It is only necessary to know the digits of the transmitter ID. The transmitter ID digits are included in the messages. Advantageously, they are placed at the end of the message so that the receiver can recover them even if it starts the reception of the transmission in the middle of the message.

In some applications, this number of sequences may not be sufficient. For example, in many applications, the transmitter IDs are generated sequentially in the factory and embedded in the transmitter circuit. It would not be convenient or sometimes not even possible to make sure that all the transmitters to be installed on one premise or in geographical proximity would produce orthogonal sequences. In such cases the number of sequences can be extended to a larger number using other techniques, some of which were extensively studied and are described in the available literature. The number of available permutations of a sequence that has 127 numbers is 127!($\approx$3E213). Even if a small subset of all the available permutations is used, the will be a large and adequate number of frequencies produced. This way, the manufacturer can still embed sequentially produced ID numbers and the transmitters could still be used without regard to the sequences that they produce. However, the method described above is advantageous for its simplicity and the unique properties or orthogonality of all sequences. The degree of orthogonality indicates how many hits (frequency agreements) there might be between two sequences upon any relative cyclic shift of the sequences. In a perfect design, for any two sequence that use the same set of frequencies, there would be only one hit. I.e., if upon any cyclic shift of two sequences, a position is found in which the same frequency is present in both sequences, then the frequencies in all other positions would differ. The sequences produced in a manner as described in the advantageous embodiment are orthogonal in that sense. Although perfect orthogonality is not necessary for proper operation of the system, it is desirable since it reduces the probability of lost packets due to collisions. However, it should be apparent that other ways of permuting the sequences could be created. Another advantage of the advantageous method of permutation is that the permutation process is reversible as previously described. This property enables the receiver to synchronize based on the transmitter ID embedded in the transmitted messages without a need for additional information bits related to the PN generator status. Since the transmitter ID is normally required in the transmitted messages, the advantageous method does not require any overhead in the transmitted messages.

In order to preserve the property of orthogonality and zero overhead as described above and enlarge the number of transmitter ID universe the following advantageous method is employed.

In the exemplary implementation, the time between the transmission of beacons and the time between the transmission opportunities is varied.

In the advantageous embodiment, the method of determining the time interval perturbation is based on a similar technique as described in conjunction with the frequency index generation, wherein the random sequence is used to alter the time interval between transmissions. I.e., each time a transmission is performed, a new number is generated and used to determine the time interval between the current and the next transmission. The time randomization values are obtained by processing the output of the PN generator used for the frequency index with bits of the transmitter ID. The processing is done as follows.

Figure 5:
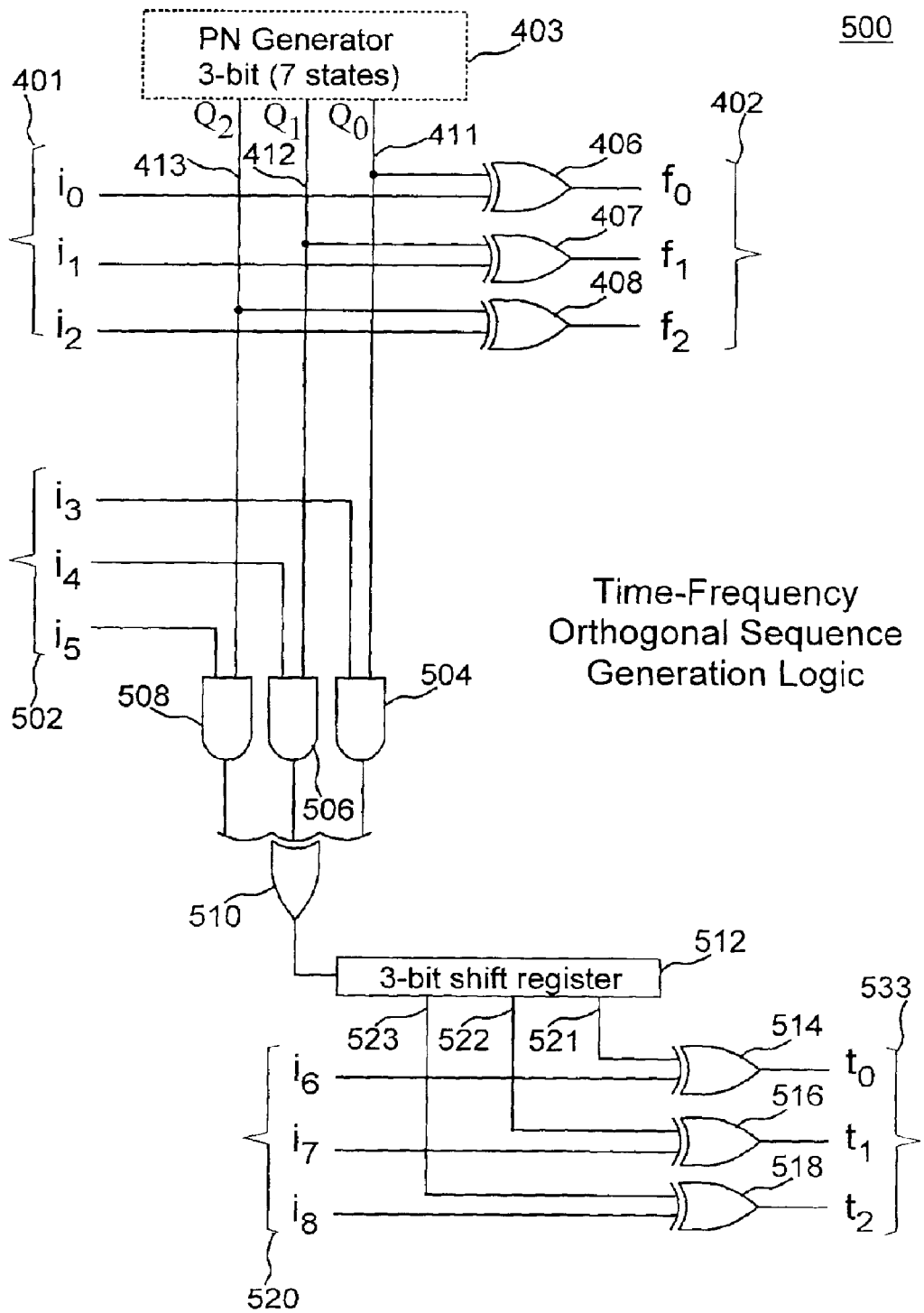
FIG. 5 is a block diagram of an example of an illustrative embodiment of a sequence generator used to determine the individual frequency-time sequences.

Referring to FIG. 5, the frequency index is produced by the PN generator 403 outputs 413, 412 and 411 and transmitter ID bits 401—$\{i_2, i_1, i_0\}$ processed with EXOR gates 408, 407, and 406 to produce index digits 402—$\{f_2, f_1, f_0\}$ as described previously in conjunction with FIG. 4. The PN generator output is further processed with transmitter ID digits 502—$\{i_5, i_4, i_3\}$ by the AND gates 508, 506 and 504 and by an EXOR gate 510. The output of the gate 510 taken one bit at the time is a shifted replica of the output of the PN generator e.g. output 411 or 412 or 413. Where the relative shift depends on the transmitter ID digits 502. The output of the gate 510 is then fed to a shift register 512 whose outputs 523, 522 and 521 are shifted replicas of the PN generator outputs 413, 412, and 411 respectively. When taken three digits at the time, the sequence produced at the output of the shift register is a shifted replica of the output of the PN generator. For example, if the PN sequence produced is order $\{7, 3, 5, 2, 1, 4, 6\}$, and bits $\{i_5, i_4, i_3\}$ 502 are 011, then the shifted sequence is $\{4, 6, 7, 3, 5, 2, 1\}$; if the bits $\{i_5, i_4, i_3\}$ are 101 then the shifted sequence is $\{2, 1, 4, 6, 7, 3, 5\}$. This way, a total of 7 shifted sequences are produced (000 input is not allowed). The shifted sequences are further processed with bits $\{i_8, i_7$ and $i_6\}$ 520 of the transmitter ID by EXOR gates 518, 516, and 514 to produce permutations of the shifted sequences at the outputs 533—$\{t_2, t_1, t_0\}$ in a manner identical to the previously described in conjunction with frequency index generation. This way, each shifted sequence can be permuted in 8 different ways creating total 7*8=56 shifted-permuted sequences. The shifted and permuted sequences are used to produce variations of the time between consecutive transmissions. In the illustrative embodiment, the numbers from a sequence are multiplied by a $\Delta T$ and added to the nominal time between transmission—TBT. Advantageously, $\Delta T$ is rounded to the nearest discrete multiple of a basic time measure unit used by a node control logic. If the permuted PN sequences are used as frequency indexes and the shifted-permuted sequences are used to randomize the time between transmission, then there are created 8*7*8=448 sequences that are time-frequency orthogonal in the sense that if two sequences coincide at one frequency and time, they will not coincide for any other frequency and time for the entire PN generator period. This is based on merely 3-bit generator of the illustrative example! Of course, if a longer shift register is used for the PN generator, a far greater number of sequences are created.

In the illustrative embodiment, an 8-bit generator is used as described previously. This results in over 6E6 orthogonal time-frequency sequences. Enough to relieve the manufacturer and applications from transmitter ID management other than sequential numbering of all manufactured transmitters. Of course, for a 8 bits shift register, 8 bits of the transmitter ID are used to obtain sequence permutation for frequency index, similarly, 8 bits are used for shifting and another 8 bits for permuting the shifted sequence to obtain the time delay variations.

The essence of this method is that in addition to two apparent dimensions of variability present in the form of permutations of frequency and time sequences, there is a third dimension added: i.e. the phase relationship variability between the frequency and time sequences. This rapidly increases the number of distinct orthogonal frequency-time sequences with increasing length of the basic PN generator as evidenced by the illustrative example. While it is possible to use other kinds of basic sequence and to use other ways of transforming the numbers of the basic sequence to obtain new sequences, the added new dimension has several advantages as evidenced in the illustrative embodiment.

The permutation process as described is an example of a more general process of transformation that transforms a set of numbers into another set of numbers (that might differ in size). It should be apparent that although a transformation resulting in the permutation as described is advantageous, other transformations might be used to derive frequency-time pattern based on the described principle.

It should also be apparent that in some implementations the order in which the shift and the second transformation (permutation) is performed might be reversed without altering the essence of the method.

Another advantage of the illustrative embodiment is that the permutations and shifting of the sequences can be performed by processing (transforming) one number of the sequence at the time, thus eliminating the need to store and manipulate the entire sequence. I.e., the permuted or shifted sequence numbers are produced one at the time as needed based on numbers from the basic sequence that are also produced one at the time as needed.

Note, that this advantageous way of producing the time-frequency indexes does not require any overhead in the transmitted messages for the synchronization purpose other than the transmitter ID that is normally required any way. This is because the receiver can instantly recover the PN generator status based on just a single received message. As described previously, the receiver can infer the status of the 8-bit generator based on the received frequency index and the transmitter ID number. I.e. the message contains the information about the 8-bit generator without explicit inclusion of the generator status bits in the message. In the illustrative embodiment, after the frequency index is obtained for a transmission, the time index is obtained by filling the shift register in the steps of storing the PN generator status, clocking the PN generator and shift register N times, and restoring PN generator status. This way, the content of the shift register 512 is not required by the receiver to obtain synchronization because the time index depends on the future content of the PN generator that can be easily duplicated in the receiver based on the present content. Therefore, the receiver can still synchronize with a transmitter based on one received message and the message does not need to include any overhead for synchronization.

In an alternative implementation, a second PN generator synchronized with the first PN generator might be used to produce the time variations wherein an information about the second generator phase is included in the transmitted message to aid the synchronization. Note, that synchronization of the first and the second generator in the transmitter is extremely important since the essence of the idea is that the cyclic shift of the second sequence is provided in respect to the reference provided by the phase of the first sequence. Only this way the resulting frequency-time hopping sequences produced in different transmitters are distinct and orthogonal.

To complete the description of the present embodiment, there are provided descriptions of exemplary implementations of a transmitter and a receiver. Although a particular implementation of the transmitter and the receiver is not so important, they are provided here an example that might further elucidate the main idea.

Figure 6:
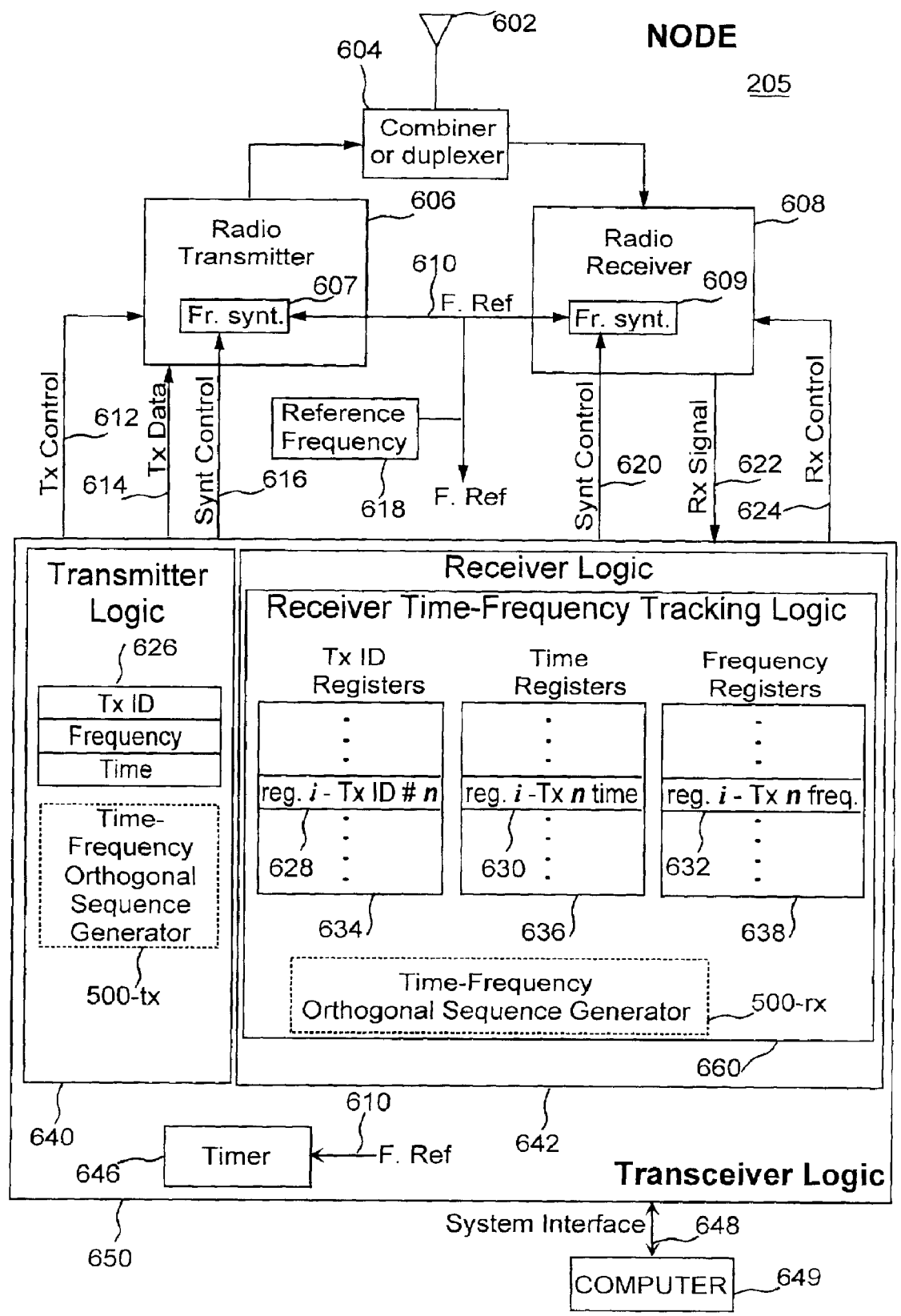
FIG. 6 is a block diagram of a node transceiver according to an advantageous embodiment of the present invention.

Referring to FIG. 6, there is shown a block diagram of an exemplary implementation of a node 205 including the node transceiver (i.e. transmitter and receiver) circuits according to the present invention.

The node transceiver includes front-end transmitter circuits 606, front-end receiver circuits 608, and transceiver logic 650. In addition, there is the combiner circuit that connects the transmitter output to the antenna 602 and the antenna to the receiver front-end. The transceiver logic 650, includes transmitter logic 640, receiver logic 642, and timer 646. The front-end transmitter circuits 606, includes a frequency synthesizer 607, and the front-end receiver circuit includes a receiver frequency synthesizer 609. Both, front-end transmitter and receiver circuits include other circuits that are not shown explicitly such as filters amplifiers, etc. The node transceiver includes also a frequency reference 618 that provides stable frequency 610 to the transceiver circuits, including synthesizers and the timer 646. The timer needs the stable reference to measure accurately the elapsed time and the synthesizers to produce a stable carrier frequency. The node transceiver logic interfaces with the node computer 649 via system interface 648. The node computer can be any computing device that can be connected to the network, i.e. a personal computer, laptop, network computer, etc.

The transmitter logic includes registers 626 that hold information about the transmitter identification code (ID), and the frequency and time for the next beacon transmission and transmission opportunities. In addition, the transmitter logic includes the time-frequency orthogonal sequence generator 500-tx operating in accordance with the principle previously described in conjunction with FIG. 5 and FIG. 4.

The receiver logic includes time-frequency tracking logic 660 that includes a set of registers 634 to hold information about ID for each transmitter that the receiver tracks and a set of registers 636 and 638 to hold information about the frequency and the time for the next beacon transmission and transmission opportunities for each transmitter that is being tracked. In addition, the time-frequency tracking logic includes the time-frequency orthogonal sequence generator 500-rx operating in accordance with the principle previously described in conjunction with FIG. 5 and FIG. 4.

In operation, the transmitter transmits beacon transmissions as previously described at decimated transmission opportunities. After each transmission opportunity, the transmitter logic determines the time and frequency for the next transmission and stores the information in the registers 626. The determination is based on the transmitter ID and the state of the timer 646, the state of the frequency and time registers 626 processed by the time-frequency orthogonal sequence generator 500-tx. The information is advantageously stored in the time units that are directly related to the timer 646 units. When transmission opportunity is due according to the timer reading and the information stored in the time register, the transmitter logic checks if the beacon transmission is due at this transmission opportunity according the decimating number that is advantageously selected to be M*N+1 (N is the PN generator period, M is an arbitrary integer number). The decimating counter state that is advanced once at each transmission opportunity is also held in the registers 626. If the beacon transmission is due, the transmitter logic programs the transmitter frequency synthesizer using synthesizer control interface 616, turns on the transmitter amplifier using transmitter control interface 612, and provides data to a modulator in the transmitter front-end circuit via transmitter data interface 614. Upon completion of the transmission, the front-end circuits are turned off using the transmitter control interface 612.

If the node needs to transmit payload (traffic) data, I.e. data other than the beacons to be transferred from one node to another, the transmitter transmits the payload data at the first next transmission opportunity.

When there is no payload data to be transmitted the transmission opportunities can be ignored except when the beacons are due.

While the opportunities are determined based on a short nominal time interval, e.g. 200 ms, the beacon transmissions are determined by decimating the sequence used for the transmission opportunities. I.e. one in every M*N+1 transmission opportunities is used to transmit beacon (N is the PN generator period, M is an arbitrary integer number). The time register also keeps the current status of the decimating counter that is advanced at every transmission opportunity and reset at the terminal count equal to the selected decimating factor.

In the advantageous implementation, when a transceiver is turned on, the transmitter enters a power-up mode during which the beacon timing signals are more frequent and longer in order to make it easier for the network to synchronize with it as described earlier. The power-up mode might continue until the synchronization is obtained or it might be terminated after a predetermined number of such transmissions. In the first case, the termination is performed after one or more network nodes establish communications with this transceiver. In any case, advantageously, the beacons include an information about when such termination will occur and when a first transmission in a normal mode will occur.

The receiver operates continuously. The receiver logic 642 sequentially compares the information stored in the time registers 636 with the status of the timer 646. When a transmission is due from any transmitter according to the timer reading, the receiver logic programs the receiver synthesizer via the synthesizer control interface 620. Then the receiver continues to process the signals provided by the receiver front-end circuits on the interface 622 for a predetermined time or until the end of the transmission is detected. The signals 622 might include, for example, demodulated baseband signal, signal strength indication, or equivalently baseband I and Q signals as commonly used in data demodulation. In another implementation, the signal might be in a form of a modulated carrier at an intermediate frequency (IF). In such case the receiver logic provides the necessary demodulation. The received signal processing is further performed by the receiver logic to extract the data form the received signal. For this purpose, the logic might include a special application specific integrated circuit (ASIC) or a general purpose digital signal processor (DSP), or other processing circuits capable of extracting the desired data. Furthermore, the front-end receiver circuit may provide all the frequency selectivity, or additional frequency selectivity might be provided by filters implemented in the receiver logic.

In addition to the desired data, the receiver logic also measures the time of arrival of each transmission. Based on this information, the receiver logic computes the discrepancy between the timing of the transmitter that transmitted the data and the receiver timing. A tracking algorithm can then be applied to adjust the computed time for the next transmission from this transmitter.

In the time between receptions of scheduled transmissions, the receiver logic scans all the available frequencies for transmissions that might occur from a new transmitters that are not yet recognized and stored in the receiver logic registers. To accomplish this, the receiver logic programs the synthesizer and monitors incoming signal for a predetermined time on each channel before proceeding to the next channel. If a valid signal is detected, the receiver stays on the present channel and tries to extract data from the signal. If at least part of the data is successfully extracted allowing the receiver to recognize the transmitter ID, then the receiver can compute the next time and frequency for transmission from this transmitter as described earlier in conjunction with the time-frequency sequence generation method. The receiver, then, starts tracking this transmitter in the same manner as other transmitters.

In the advantageous embodiment, the frequency registers 638 hold for each transmitter the state of the PN generator used by the transmitter to produce the frequency indexes and time variations. If the synchronization is obtained with a given transmitter, the state of the PN generator is identical to that in the transmitter. In the illustrative embodiment, the time registers 636 hold numbers indicating time of the next transmission opportunity for each transmitter by indicating the state of the timer 646 at the time when the next transmission opportunity is due from the transmitter. In addition, the time registers 636 holds the states of the decimating counters used to determine if the beacon transmission is due at a transmission opportunity.

In operation, the receiver logic 642 sequentially compares the data content of the time registers 636 with the data content of the timer 646. When the time register i 630 equals the timer 646, the receiver logic declares that the transmission opportunity is due from a transmitter n whose ID is stored in the ID register i 628. Then, the receiver logic programs the receiver frequency synthesizer 609 according to the data content in the frequency register i 632 and the transmitter ID n, attempts to decode the demodulated signal, changes the content of the time register based on the number representative of the time interval between the transmissions for this transmitter and changes the content of the frequency register according to a predetermined algorithm for this transmitter. I.e. the frequency and the time registers are updated each time a transmission is due regardless whether the transmission was received successfully. The new content of the frequency register is determined using the time-frequency orthogonal sequence generator according to the algorithm for the frequency use by the transmitters as described previously.

The new content of the time register is calculated based on the current content of the receiver timer and a number representative of the time between the current transmission and the next transmission for this transmitter. This number is calculated based on the nominal value of the time between the transmissions and adjusted by the time variation as performed based on pseudo random sequences according to the previously described algorithm. In addition, this number is corrected by a correction factor based on the measured difference between the transmitter time base and the time base of the receiver. The difference is determined in a manner described later in details. In the advantageous embodiment, the numbers representative of the time base differences are stored in the time registers 636 separately for each transmitter and are independent from the numbers representing the time of the next transmission, i.e. the time registers are split to hold two independent numbers.

It should be noted that even if crystal oscillators are used in the transmitters and the receiver to control the timing, the error accumulated during the time between transmissions can be significant compared to the transmission time. For example, if the nominal period between the transmissions is 10 seconds and the crystal frequency error due to tolerance and temperature changes is +/− 20 ppm (parts per million) for the transmitter and +/− 10 ppm for the receiver, then the error might be as large as 0.3 ms. If the transmissions are in forms of packets, and the time for the transmission of one packet is 1 ms, then the error is significant. In reality, such tight tolerance is difficult to achieve and expensive and therefore in many applications a much bigger error will be accumulated. In order to minimize the time error accumulated during the long time between the transmissions, the receiver can store the time difference between the ideal and the actual time of the packet reception and use the difference to predict more accurately the next transmission time. For example, if the timer resolution is 0.01 ms, then the next transmission time can be predicted with accuracy 0.01 ms, providing that the temperature does not change appreciably over 10 second period. This represents vast improvement. I.e. the receiver can program its frequency 0.01 ms in advance to each new frequency, examine it for the duration of the packet, then program to the next frequency and so on.

During the acquisition, when the time error is not known, the receiver needs to tune to the first frequency at least 0.3 ms in advance. Then, the receiver monitors the received signal. If during the next 0.6 ms no valid signal is present, the receiver programs to the next frequency 0.6 ms in advance and dwells on that frequency for 1.2 ms and so on. (If worse tolerances are used, the receiver needs to tune earlier and the time the receiver dwells on a single frequency expecting the next transmission is proportionately longer.)

Advantageously, in the illustrative embodiment, to ease this acquisition problem, the receiver includes a frequency error detector. Such a detector might be based on several different principles and it is not important for the purpose of this what principle is chosen. In addition, in the transmitter, the transmitted carrier frequency and the time interval generator timing are derived from the same source; and in the receiver, the receiver frequency and the receiver timer are derived from the same reference. In operation, the receiver can measure the frequency difference between the transmitted carrier and the receiver frequency and use the measured error to determine the difference between the transmitter reference frequency and the receiver reference frequency based on just one partially decoded message. Knowing the transmitter carrier frequency and the frequency difference in the received signal, the receiver can compute the relative frequency difference of the transmitter and the receiver reference frequencies and use the computed difference to more accurately determine the time of the next transmission.

The frequency difference measurement is accomplished in the following way. Assuming that the transmitter frequency accuracy is +/− 20 ppm and the receiver is +/− 10 ppm, the carrier frequency is 915 MHZ and the IF frequency is 10.7 MHz, the absolute maximum error between the receiver frequency synthesizer and the received carrier can be as much as 2760 Hz (915E6*20E-6+925.7E6*10E6). I.e., the resulting IF frequency is offset from its nominal value by this amount. This represents 260 ppm of the nominal IF frequency. An ordinary frequency counter with a time base accuracy determined by the receiver crystal oscillator, i.e. +/− 10 ppm can detect this error and measure it with good accuracy. The accuracy should be better than +/− 10 Hz ($\frac{1}{26}$ of the maximum error). Based on the measured frequency error, the relative frequency offset is calculated and the time correction factor for each transmitter is adjusted accordingly. For example, if the measured error is +1380 Hz then the relative frequency error is approximately equal to +15 ppm. If the nominal value of the time interval between two consecutive transmissions is 10 seconds, then the required correction is +0.15 ms if the receiver uses high injection, i.e. the frequency of the synthesizer in the receiver is nominally equal to the received frequency plus the IF frequency, and −0.15 ms if low injection is used.

In the advantageous embodiment, the time base correction factor stored for each transmitter is also used to adjust the center frequency of the receiver and thus aid the reception of the transmitted packets, thus lowering the requirements for the length of the preamble included in each packet for the purpose of carrier and data timing acquisition. This is accomplished by adjusting the receiver frequency momentarily just prior to the reception of the packet from a transmitter from which a packet is due or by applying appropriate rotation to the received complex signal in the signal processor included in the receiver logic.

In operation, the receiver scans the selected frequencies during the time when it is not occupied with the scheduled reception from the transmitters or checking the time registers. Also the receiver scans all the available frequencies in addition to the selected frequencies. During the scan, the receiver uses signal strength to detect if there is signal energy transmitted on a current frequency; if so, then the receiver measures a predetermined unique properties of the modulated carrier. If the signal energy is not present or the unique property is not valid, the receiver will quickly proceed to examine the next frequency. Otherwise, the receiver will stay on this frequency and try to decode the message. This way, all the selected frequencies are examined several times per second ensuring that the receiver can receive a power-up message. Also, the scan of all available frequencies is fast; the synchronization can be regained faster and more reliably because the receiver will not waste much of the time for an examination of very weak or spurious signals.

The receiver time-frequency tracking logic 660, as described, is particularly suitable for a software implementation. Another example of the receiver time-frequency tracking logic 660 is shown in FIG. 7.

Accordingly, the receiver time-frequency tracking logic includes a programmable counters 781-1 through 781-N, a time-frequency orthogonal sequence generators 500-1 through 500-N and transmitter ID register 791-1 through 791-N. There is a counter, a generator, and an ID register for each transmitter to be tracked. If there are N such sets (counter-generator-register), the tracking logic can track contemporaneously N transmitters. The counters, generators and registers, all interact via the interface 645 and interrupts 7841 through 784N with the receiver logic 642. Consider set i, i.e. any set 1 through N. In operation, the transmitter ID #1 stored in the ID register i 791-$i$ is fed to the time-frequency orthogonal sequence generator i 500-$i$ that produces the time and the frequency indexes for the next transmission from the transmitter #1 in accordance with the principle previously described in conjunction with FIG. 5 and FIG. 4. The frequency index is used by the receiver logic to compute the expected frequency of the transmitter and to tune the receiver frequency accordingly when the transmission is due from the transmitter #1. The time index is used to program the programmable counter 781-$i$. The programmable counter 781-$i$ includes four programming registers. The Nominal Interval register 787-$i$, the Interval Hop register 788-$i$, the One Time Adjust register 789-$i$ and the decimating counter 786-$i$. In operation, the programmable register counts according to the programming registers and when the terminal count is reached, the counter generates an interrupt 784-$i$ to the receiver logic and to the time-frequency orthogonal sequence generator 500-$i$. Subsequently, the time-frequency orthogonal sequence generator generates new frequency index and new time index. The new time index is used to program the Interval Hop register that is used by the frequency counter to compute the next expected time for the transmission. The Interval Hop indicates how the Nominal Interval is modified, i.e. the Interval Hop signed value is added to the Nominal Interval to determine the terminal count. The One Time Adjust register, is programmed by the receiver logic based on the time difference between the expected and actual time of transmission. In addition, the Nominal Interval is adjusted based on the measured time base difference between the transmitter and the receiver as previously described. The decimating counter, once set properly at a first reception of a beacon from a transmitter, indicates to the receiver logic when the beacon is due at the next transmission opportunity. The receiver prioritizes its operation based on this information to minimize loss of beacon reception at the expense of other transmission opportunities when they coincide in time.

Figure 7:
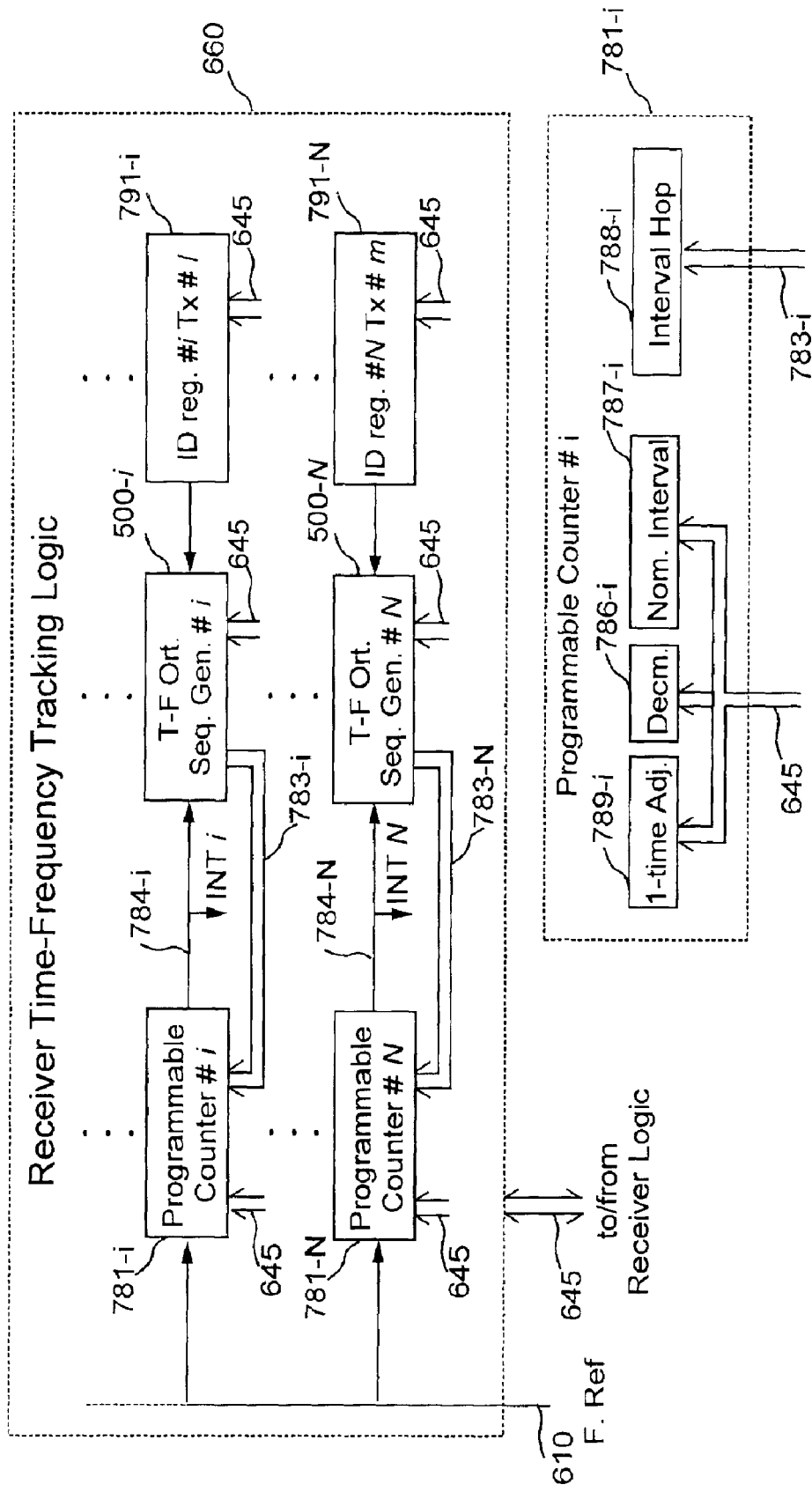
FIG. 7 is a block diagram of alternative implementation of the node receiver time-frequency tracking logic according to another advantageous embodiment of the present invention.

The alternative implementation of the receiver time-frequency tracking logic 660 of FIG. 7 is particularly suitable for a hardware implementation thanks to the elegant simplicity of the time-frequency orthogonal sequence generator 500 that can be easily replicated in multitude at a very low cost.

For the purpose of this specification, the transmitter control operation can be performed by one or more dedicated or shared logic or processor or any other computing devices, e.g. personal computer or other kind of computer that might be integrated or external or even remote. Insofar as the functions performed by these logic or processor or computing devices relate to the operation of the transmitter they are considered a part of the transmitter for the purpose of this specification. The same claim is made for all the receiver functions.

In the illustrative embodiment described here, references are made to several elements such as generators, logic, registers, control operations, etc. It is to be understood that various elements described here can be realized in several different forms including software and hardware in their various forms and combinations. E.g. the "logic" can be a hardware such as a gate or memory element, or it can be a piece of software to perform a certain task. In the later case, logic simply means "intelligence".

Although illustrative embodiments of the invention have been described in detail herein with reference to the accompanying drawings, it is to be understood that the invention is not limited to those precise embodiments, and that various changes and modifications can be effected therein by one skilled in art without departing from the scope and spirit of the invention as defined by the appended claims.

For example, it should be apparent, that although the described embodiment uses frequency hopping modulation, some other implementations that uses other transmission methods might also benefit from the present invention.

It is to be understood that the above-described embodiments are merely illustrative of the invention and that many variations might be devised by those skilled in the art without departing from the scope of the invention. It is therefore intended that such variations be included within the scope of the following claims and their equivalents.

What is claimed is:

1. A network comprising:

at least three nodes, and each node comprising a transmitter for transmitting, to other nodes, timing for a plurality of transmission opportunities of said node and for transmitting at at least one of said transmission opportunities to initiate data transmission to another node, and each of at least two of said nodes comprising logic for holding data indicative of an expanded time and an expected frequency of at least one future transmission opportunity of each of a plurality of nodes, and each of said at least two of said nodes comprising a receiver for receiving transmissions at transmission opportunities of at least one of said plurality of nodes.

2. The network of claim 1 wherein:

said transmission opportunities are at time intervals and frequencies that are determined according to at least one sequence that is unique for each said node.

3. The network of claim 1 wherein:

said transmitter is for transmitting said timing by transmitting beacons at time intervals and frequencies that are determined according to at least one sequence that is unique for each said node.

4. A method of operating a network comprising:

transmitting from each node, timing for a plurality of transmission opportunities of said node, and transmitting at at least one of said transmission opportunities to initiate data transmission to another node, and holding, each of at least two of said nodes, data indicative of an expected time and an expected frequency of at least one future transmission opportunity of each of a plurality of nodes, and receiving, at each of said at least two of said nodes, transmission at transmission opportunities of at least one of said plurality of nodes.

5. The method of claim 4 further comprising:

determining time intervals and frequencies of said transmission opportunities at each said node, according to at least one sequence that is unique for each said node.

6. The method of claim 4 further comprising:

transmitting said timing by transmission beacons at time intervals and frequencies that are determined according to at least one sequence that is unique for each said node.

7. A network node comprising:

a transmitter for transmitting, to other nodes, timing for a plurality of transmission opportunities of said node and for transmitting at at least one of said transmission opportunities to initiate data transmission to another node, and logic for holding data indicative of an expected time and an expected frequency of at least one future transmission opportunity of each of a plurality of nodes, and a receiver for receiving transmission at transmission opportunities of at least one of said plurality of nodes.

8. The node of claim 7 wherein:

said transmission opportunities are at time intervals and frequencies that are determined according to at least one sequence that is individual for said node.

9. The node of claim 7 wherein:

said transmitter is for transmitting said timing by transmitting beacons at time intervals and frequencies that are determined according to at least one sequence that is individual for said node.

10. A method of operating a network node comprising:

transmitting, to other nodes, timing for a plurality of transmission of said node, and transmitting at at least one of said transmission opportunities to initiate transmission to another node, and holding data indicative of an expected time and an expected frequency of at least one future transmission opportunity of each of a plurality of nodes, and receiving transmission at transmission opportunities of at least one of said plurality of nodes.

11. The method of claim 10 further comprising:

determining time intervals and frequencies of said transmission opportunities, at said node, according to at least one sequence that is individual for said node.

12. The method of claim 10 further comprising:

transmitting said timing by transmitting beacons at time intervals and frequencies that are determined according to at least one sequence that is individual for said node.

13. A network comprising:

at least three nodes, and each node comprising a transmitter for transmitting data according to timing for transmissions, wherein said node is capable of producing said timing for transmission in the absence of any information of other nodes timing, and each of at least two of said nodes comprising a receiver for receiving transmission from each of a plurality of said nodes, and said receiver comprising a tracking mechanism for tracking contemporaneously timing for transmission of each of a plurality of said nodes.

14. The network of claim 13 wherein:

said tracking mechanism comprises logic for holding data indicative of an expected time and an expected frequency of at least one future beacon transmission from each of a plurality of nodes.

15. The network of claim 13 wherein:

said transmitter is for transmitting said timing for transmissions by transmitting beacons at time intervals and frequencies that are determined according to at least one sequence that is unique for each said node.

16. The network of claim 13 wherein:

said transmitter is for transmitting said data at time intervals and frequencies that are determined according to at least one sequence that is unique for each said node.

17. A method of operating a network comprising:

producing, at each node, timing for transmissions that is independent of other nodes' timings for transmissions, and transmitting data according to said timing, and tracking, at said each node, contemporaneously timing for transmission of a plurality of nodes, and receiving transmissions, at said each node, from at least one of said plurality of nodes in accordance with said tracking.

18. The method of claim 17 further comprising:

holding, at said each node, data indicative of an expected time and a expected frequency of at least one future transmission from each of a plurality of nodes.

19. A network node comprising:

a transmitter for transmitting data according to timing for transmissions, wherein said node is capable of producing said timing for transmission in the absence of any information of other nodes' timing, and a receiver for receiving transmission from each of a plurality of nodes, and said receiver comprising a tracking mechanism for tracking contemporaneously timing for transmissions of each of a plurality of nodes.

20. The node of claim 19 wherein:

said tracking mechanism comprises logic for holding data indicative of an expected time and an expected frequency of at least one future beacon transmission from each of a plurality nodes.

21. The node of claim 19 wherein:

said transmitter is for transmitting said timing for transmission by transmitting beacons at time intervals and frequencies that are determined according to at least one sequence that is individual for said node.

22. The node of claim 19 wherein:

said transmitter is for transmitting said data at time intervals and frequencies that are determined according to at least one sequence that is individual for said node.

23. A method of operating a network node comprising:

producing timing for transmission that is independent of other nodes' timings for transmissions, and transmitting data according to said timing, and tracking contemporaneously timing for transmission of each of a plurality of nodes, and receiving transmission from at least one of said plurality of nodes in accordance with said tracking.

24. The method of claim 23 further comprising:

holding data indicative of an expected time and an expected frequency of at least one future transmission from each of a plurality of nodes.

* * * * *